US010600125B1

(12) United States Patent
Christensen

(10) Patent No.: US 10,600,125 B1
(45) Date of Patent: *Mar. 24, 2020

(54) SYSTEM AND METHOD FOR DETERMINING AN INDICATION OF A LOCATION OF A DEVICE IN A VEHICLE

(71) Applicant: STATE FARM MUTUAL AUTOMOBILE INSURANCE COMPANY, Bloomington, IL (US)

(72) Inventor: Scott T. Christensen, Salem, OR (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 526 days.

This patent is subject to a terminal disclaimer.

(21) Appl. No.: 15/392,861

(22) Filed: Dec. 28, 2016

Related U.S. Application Data

(63) Continuation of application No. 14/835,415, filed on Aug. 25, 2015, now Pat. No. 9,576,322.

(60) Provisional application No. 62/186,205, filed on Jun. 29, 2015.

(51) Int. Cl.
*G06Q 40/08* (2012.01)
*H04W 4/02* (2018.01)
*H04B 17/318* (2015.01)
*H04W 4/40* (2018.01)

(52) U.S. Cl.
CPC ........... *G06Q 40/08* (2013.01); *H04B 17/318* (2015.01); *H04W 4/026* (2013.01); *H04W 4/40* (2018.02)

(58) Field of Classification Search
CPC .................................................... G06Q 40/08
See application file for complete search history.

(56) References Cited

U.S. PATENT DOCUMENTS

| 8,290,480 | B2 | 10/2012 | Abramson et al. |
| 8,750,853 | B2 | 6/2014 | Abramson et al. |
| 8,952,800 | B2 | 2/2015 | Bantz et al. |
| 9,020,482 | B2 | 4/2015 | Jones |
| 9,078,116 | B2 | 7/2015 | Abramson et al. |
| 9,161,170 | B2 | 10/2015 | Carmel-Veilleux et al. |
| 9,326,103 | B2 * | 4/2016 | Shen ................ H04W 4/04 |

(Continued)

OTHER PUBLICATIONS

Chu, Hon Lung, "In-Vehicle Driver Detection Using Mobile Phone Sensors", 2011. (Year: 2011).*
Bo, Cheng et al. "TEXIVE: Detecting Drivers Using Personal Smart Phones by Leveraging Inertial Sensors", Jul. 6, 2013.
Emspak, J., "Your Cellphone Could Be a Sonar Device", LiveScience, 2013, http://news.yahoo.com/cellphone-could-sonar-device-195110933. html, 7 pages.

(Continued)

*Primary Examiner* — Eric T Wong
(74) *Attorney, Agent, or Firm* — Marshall, Gerstein & Borun LLP

(57) ABSTRACT

A computer-implemented method for determining an indication of a location of a first device in a vehicle is presented. A determination may be made of when a second device in the vehicle transmits a signal. When the second device transmits the signal, an indication of a direction of orientation of the first device may be determined. The indication of the direction of orientation of the first device may be affected by the signal being transmitted by the second device. The indication of the location of the first device in the vehicle may be determined based on an indication of a direction of motion of the vehicle and the indication of the direction of orientation of the first device. The indication of the location of the first device may include an indication of whether the first device is associated with a driver seat of the vehicle.

20 Claims, 8 Drawing Sheets

(56) References Cited

U.S. PATENT DOCUMENTS

| | | | |
|---|---|---|---|
| 2003/0151401 A1* | 8/2003 | Flament | G01D 5/2086 324/207.11 |
| 2011/0021234 A1 | 1/2011 | Tibbitts et al. | |
| 2012/0071151 A1 | 3/2012 | Abramson et al. | |
| 2012/0176232 A1 | 7/2012 | Bantz et al. | |
| 2012/0232838 A1* | 9/2012 | Kemppi | G01C 17/28 702/150 |
| 2012/0326855 A1 | 12/2012 | Bantz et al. | |
| 2013/0295901 A1 | 11/2013 | Abramson et al. | |
| 2013/0295957 A1* | 11/2013 | Haverinen | H04W 4/04 455/456.1 |
| 2014/0130361 A1* | 5/2014 | Oliver | G01C 17/28 33/301 |
| 2014/0179353 A1 | 6/2014 | Simon | |
| 2014/0180730 A1 | 6/2014 | Cordova et al. | |
| 2014/0213234 A1 | 7/2014 | Inselberg | |
| 2014/0256303 A1 | 9/2014 | Jones | |
| 2014/0287738 A1 | 9/2014 | Abramson et al. | |
| 2014/0335902 A1* | 11/2014 | Guba | H04W 4/027 455/456.4 |

OTHER PUBLICATIONS

Hareuveny, et al., Characterization of Extremely Low Frequency Magnetic Fields from Diesel, Gasoline and Hybrid Cars under Controlled Conditions, Ed. Martin Röösli. International Journal of Environmental Research and Public Health, 12.2 (2015): 1651-1666.

Images of State Farm Mutual Automobile Insurance Company Drive Safe & Save™ mobile app, Version 1.0.3.

Laursen, L., "Echolocation by Smartphone Possible", IEEE Spectrum, 2013, http://spectrum.ieee.org/consumer-electronics/portable-devices/echolocation-by-smartphone-possible, 3 pages.

Non-Final Office Action for U.S. Appl. No. 14/835,415, dated Dec. 4, 2015.

Non-Final Office Action for U.S. Appl. No. 14/835,415, dated Apr. 15, 2016.

Notice of Allowance for U.S. Appl. No. 14/835,415, dated Oct. 24, 2016.

* cited by examiner

500

| RECEIVE INDICATION OF ASSOCIATION OF THIRD DEVICE(S) WITH SECOND PARTY/PARTIES |
|---|

↓ 502

| (I) RECEIVE INDICATION(S) OF FIRST DIRECTION(S) OF ORIENTATION OF THIRD DEVICE(S), RELATIVE TO NORTH, AND/OR (II) WHEN SECOND DEVICE TRANSMITS SIGNAL, RECEIVE INDICATION(S) OF SECOND DIRECTION(S) OF ORIENTATION OF THIRD DEVICE(S), EACH INDICATION BEING AFFECTED BY THE SIGNAL TRANSMITTED BY THE SECOND DEVICE AND CORRESPONDING TO A RESPECTIVE ONE OF THE THIRD DEVICE(S) |
|---|

↓ 504

| DETERMINE (I) LOCATION OF SECOND DEVICE AND/OR (II) FOR FIRST DEVICE AND/OR AT LEAST ONE OF THE THIRD DEVICE(S), CORRESPONDING INDICATION(S) OF STRENGTH OF SIGNAL TRANSMITTED BY SECOND DEVICE |
|---|

↓ 506

| DETERMINE DIFFERENCE(S) BETWEEN INDICATIONS OF FIRST AND SECOND DIRECTIONS OF ORIENTATION OF THIRD DEVICE(S) |
|---|

↓ 508

| DETERMINE, FOR EACH ONE OF THE THIRD DEVICE(S), INDICATION OF LOCATION BASED ON THE INDICATION OF THE DIRECTION OF MOTION OF THE VEHICLE AND BASED ON AT LEAST ONE OF INDICATION OF DIRECTION OF ORIENTATION OF FIRST DEVICE, AT LEAST ONE OF INDICATION(S) OF FIRST DIRECTION(S) OF ORIENTATION OF THIRD DEVICE(S), OR AT LEAST ONE OF INDICATION(S) OF SECOND DIRECTION(S) OF ORIENTATION OF THIRD DEVICE(S), INCLUDING DETERMINING INDICATION OF WHETHER THIRD DEVICE IS ASSOCIATED WITH DRIVER SEAT OR PASSENGER SEAT, TO FACILITATE INSURING OF SECOND PARTY/PARTIES |
|---|

↓ 510

| USE INDICATION OF LOCATION OF FIRST DEVICE AND/OR AT LEAST ONE OF INDICATION(S) OF LOCATION(S) OF THIRD DEVICE(S) TO DETERMINE UPDATED INSURANCE DATA ASSOCIATED WITH FIRST PARTY AND/OR AT LEAST ONE OF THE SECOND PARTY/PARTIES SO AS TO DETERMINE (I) INFORMATION REGARDING COST OF INSURING FIRST PARTY AND/OR THE AT LEAST ONE OF THE SECOND PARTY/PARTIES WITH RESPECT TO THE VEHICLE AND/OR (II) INFORMATION REGARDING COST OF INSURING FIRST PARTY AND/OR THE AT LEAST ONE OF THE SECOND PARTY/PARTIES WITH RESPECT TO ANOTHER VEHICLE |
|---|

| ANGLE (DEGREES) | STRENGTH | INDICATION OF LOCATION |
|---|---|---|
| +45 | STRONG | DRIVER |
| -45 | STRONG | FRONT PASSENGER |
| +30 | WEAK | LEFT REAR PASSENGER |
| -30 | WEAK | RIGHT REAR PASSENGER | great# SYSTEM AND METHOD FOR DETERMINING AN INDICATION OF A LOCATION OF A DEVICE IN A VEHICLE

CROSS-REFERENCE TO RELATED APPLICATIONS

This application is a continuation of U.S. patent application Ser. No. 14/835,415, which is entitled "System and Method for Determining an Indication of a Location of a Device in a Vehicle," which was filed on Aug. 25, 2015, and which claims the benefit of U.S. Provisional Patent Application No. 62/186,205, which is entitled "System and Method for Determining an Indication of a Location of a Device in a Vehicle," and which was filed on Jun. 29, 2015. Each of U.S. patent application Ser. No. 14/835,415 and U.S. Provisional Patent Application No. 62/186,205 is hereby expressly incorporated by reference herein in its entirety.

FIELD OF THE DISCLOSURE

The present disclosure generally relates to locating a device and, more particularly, to a system and method for determining an indication of a location of a device in a vehicle.

BACKGROUND

An insurance provider has an interest in receiving data regarding an insured party, with respect to a vehicle, that is sufficient for the insurance provider to reliably determine information needed to offer the insured party appropriate terms of insurance coverage with respect to the vehicle. Appropriate terms of insurance coverage may be affected by factors such as an indication of risk that the insured party will incur a loss with respect to the vehicle.

Insurance providers in some cases have the ability to identify when an insured party is in a vehicle and to collect telematics data regarding the vehicle, but this information can be used to only a minimal extent. In other words, the fact that an insured party is in a vehicle, even in combination with telematics data regarding driving of the vehicle, may not be sufficient to allow an insurance provider to reliably determine information needed to offer the insured party appropriate terms of insurance coverage with respect to the vehicle.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method for determining an indication of a location of a first device in a vehicle may be provided. The method may include receiving, using one or more processors, an indication of a direction of motion of the vehicle. The method may also include receiving, using the one or more processors, when a second device in the vehicle transmits a signal, an indication of a direction of orientation of the first device. The indication of the direction of orientation of the first device may be affected by the signal transmitted by the second device. The indication of the direction of orientation of the first device may be determined using the first device. The method may further include determining, using the one or more processors, the indication of the location of the first device in the vehicle based on the indication of the direction of motion of the vehicle and the indication of the direction of orientation of the first device. The first device may be associated with a party in the vehicle. The indication of the location of the first device may include an indication of whether the first device is associated with a driver seat of the vehicle or whether the first device is associated with a passenger seat of the vehicle to facilitate insuring of the party.

In another embodiment, a system for determining an indication of a location of a first device in a vehicle may be provided. The system may include the first device. The first device may be associated with a party in the vehicle. The system may also include a second device in the vehicle. The second device may be configured to transmit a signal. The system may further include one or more processors and one or more memories coupled to the one or more processors. The one or more memories may include non-transitory computer executable instructions stored therein that, when executed by the one or more processors, cause the one or more processors to receive an indication of a direction of motion of the vehicle. The non-transitory computer executable instructions, when executed by the one or more processors, may also cause the one or more processors to receive, when the second device transmits the signal, an indication of a direction of orientation of the first device. The indication of the direction of orientation of the first device may be affected by the signal transmitted by the second device. The indication of the direction of orientation of the first device may be determined using the first device. The non-transitory computer executable instructions, when executed by the one or more processors, may further cause the one or more processors to determine the indication of the location of the first device in the vehicle based on the indication of the direction of motion of the vehicle and the indication of the direction of orientation of the first device. The indication of the location of the first device may include an indication of whether the first device is associated with a driver seat of the vehicle or whether the first device is associated with a passenger seat of the vehicle to facilitate insuring of the party.

In yet another embodiment, a computer readable storage medium may be provided that includes non-transitory computer readable instructions stored thereon for determining an indication of a location of a first device in a vehicle. The instructions, when executed on one or more processors, may cause the one or more processors to receive an indication of a direction of motion of the vehicle. The instructions, when executed on the one or more processors, may also cause the one or more processors to receive, when a second device in the vehicle transmits a signal, an indication of a direction of orientation of the first device. The indication of the direction of orientation of the first device may be affected by the signal transmitted by the second device. The indication of the direction of orientation of the first device may be determined using the first device. The instructions, when executed on the one or more processors, may further cause the one or more processors to determine the indication of the location of the first device in the vehicle based on the indication of the direction of motion of the vehicle and the indication of the direction of orientation of the first device. The first device may be associated with a party in the vehicle. The indication of the location of the first device may include an indication of whether the first device is associated with a driver seat of the vehicle or whether the first device is associated with a passenger seat of the vehicle to facilitate insuring of the party.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 5 is a flow chart of an example method, routine, or process for determining an indication of a location of at least one additional device in a vehicle;

Figure 1:
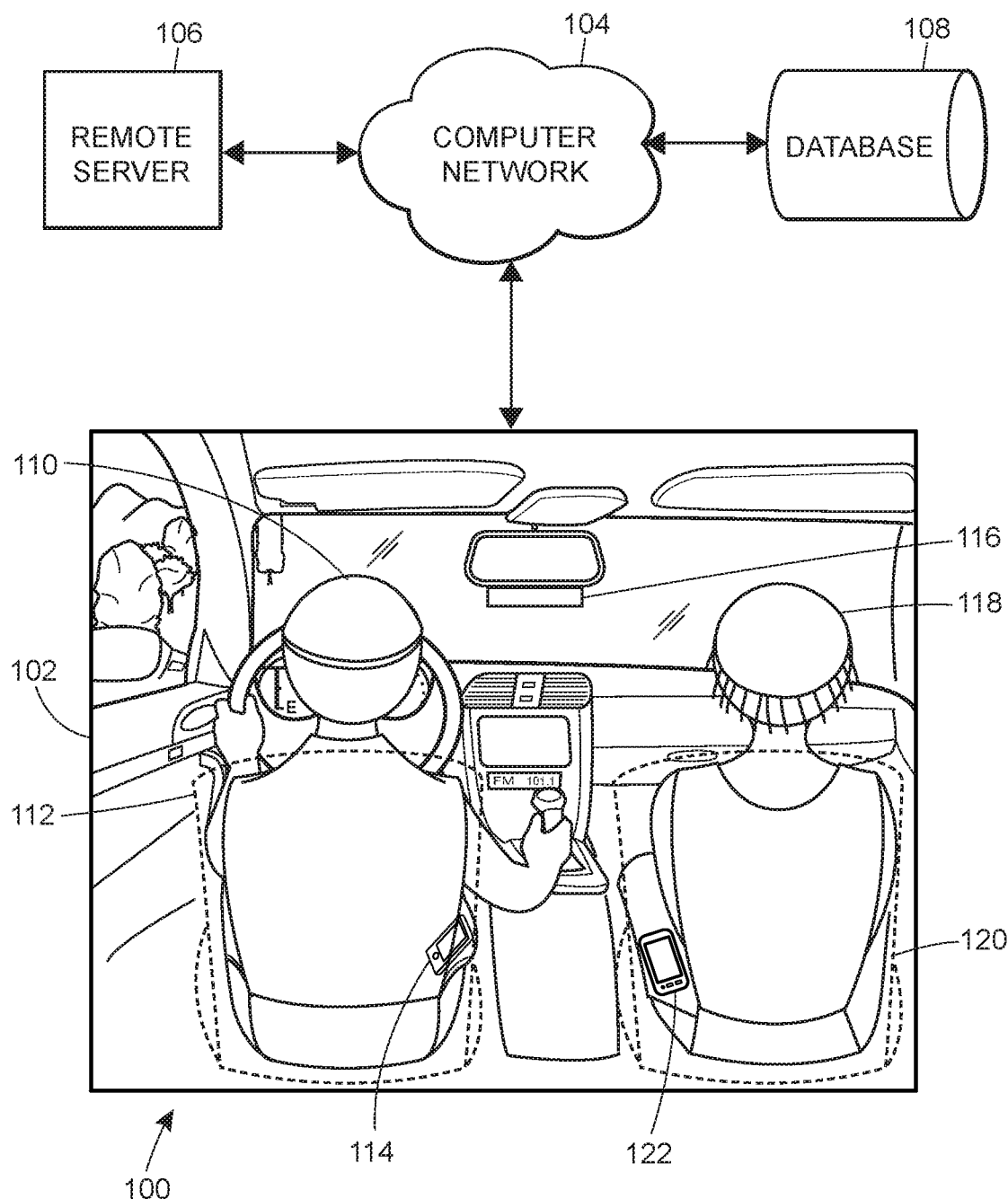
FIG. 1 illustrates an example system for determining an indication of a location of a device in a vehicle.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

I. Example Indication of Location of a Device in a Vehicle, where the Device is Associated with a Party in the Vehicle The present embodiments relate to, inter alia, a system and method for determining an indication of a location of a device in a vehicle. More particularly, a first device in the vehicle may be associated with (e.g., owned by or in the possession of) a party in the vehicle. An indication of the direction of motion of the vehicle, and an indication of a direction of orientation of the first device may be received when a second device in the vehicle transmits a signal. The indication of the direction of orientation of the first device may be affected by the signal transmitted by the second device and may be determined using the first device. Based on the indication of the direction of motion of the vehicle, and the indication of the direction of orientation of the first device, an indication of the location of the first device in the vehicle associated with the party in the vehicle may be determined. The determined indication may include (or may be) an indication of whether the first device is associated with a driver seat of the vehicle or a passenger seat of the vehicle. As such, the determined indication may indicate whether the party associated with the first device is the driver of the vehicle or a passenger of the vehicle, and this information may be used to facilitate insuring of the party.

The first device may be, for example, a mobile phone of the party, such as a smart phone. The second device may be provided by the insurance provider for use in the vehicle and may be or include, for example, a magnet, such as an electromagnet or any other suitable magnet or material(s) that may act as a magnet, and thus may transmit a magnetic signal to affect the indication of the direction of orientation of the first device. In one example, the first device associated with the party may include a magnetometer that determines the indications of the directions of motion and orientation. The indication of whether the party associated with the first device is the driver of the vehicle or a passenger of the vehicle may be used to determine updated insurance data associated with the party (and, if desired, any other parties in the vehicle), such as updated insurance data that incorporates driving data corresponding to drives for which the party is the driver of the vehicle. This updated insurance data may be used to determine information regarding a cost of insuring the party (e.g., premiums, discounts, etc.) with respect to the vehicle or with respect to another vehicle, such as if the party applies for an insurance policy with respect to a new vehicle the party purchases or with respect to a different vehicle for which the party wishes to be insured.

By providing a system and method that allow determination of an indication of a location of a first device in a vehicle that is associated with a party in the vehicle, so as to indicate whether the party associated with the first device is the driver of the vehicle or a passenger, various advantages are achieved. For example, the ability of an insurance provider to determine where in a vehicle a party is located, and not simply that the party is generally located somewhere in the vehicle, allows the insurance provider to correlate driving data that corresponds to time during which the party is the driver of the vehicle with the party. As such, the manner in which the cost of insuring the party is determined may be improved. More particularly, the interaction between the first device (e.g., smart phone) and the second device (e.g., including a magnet) as described above and as more fully described herein, may fundamentally improve the way in which insuring the party is facilitated (e.g., the way in which the cost of insuring the party is determined, whether with respect to the vehicle at issue or another vehicle). Other advantages will be recognized by one of ordinary skill in the art in light of the teaching and disclosure herein.

II. Example System and Related Functionality

FIG. 1 illustrates an example system 100 for determining an indication of a location of a device in a vehicle. The example system 100 may include a vehicle 102 (only a portion of which is shown in FIG. 1 for ease of illustration and explanation), a computer network 104, a remote server 106, and a database 108 or other data storage mechanism (e.g., one or more hard disk drives, optical storage drives, solid state storage devices, etc.). As shown in FIG. 1 and described in further detail below, each of the vehicle 102, the remote server 106, and the database 108 may be communicatively coupled to the computer network 104. In other embodiments, various ones of the elements of the example system 100 may be communicatively coupled to one another in a manner other than via the computer network 104. By way of example, the remote server 106 may be directly coupled to the database 108 through a dedicated wired or wireless link. As in other examples shown and described herein, singular instances of various elements may be shown as such for ease of illustration and explanation. Thus, for example, the example system 100 may include a number of vehicles 102 with parties therein that are insured by an insurance provider, and any suitable number of remote servers 106 and databases 108.

The computer network 104 may be a computer network of an insurance provider (e.g., provided or used by the insurance provider, or communications over which the insurance provider otherwise controls or facilitates). In various embodiments, as further described below, processors of the remote server 106 and/or devices in the vehicle 102 may execute instructions to transmit data to, receive data from, or otherwise communicate with one another and/or the database 108, for example, via the computer network 104. The computer network 104 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The computer network 104 may also or alternatively be or include one or more cellular networks such as code division multiple access (CDMA) network, GSM (Global System for Mobile Communications) network, WiMAX (Worldwide Interoperability for Microwave Access) network, Long Term Evolution (LTE) network, etc.

As shown in the example system 100, the vehicle 102 includes a driver 110 seated in a driver seat 112 and associated with (e.g., owning and/or possessing) a first device 114, such as a smart phone. The vehicle 102 also includes a second device 116, which in the example system 100 is shown attached to a rearview mirror of the vehicle 102. As discussed above and in further detail below, the second device 116 may be provided by the insurance provider, may include a magnet, and may transmit a signal, e.g., a magnetic signal. The vehicle 102 may also include a front passenger 118 seated in a front passenger seat 120 and associated with a third device 122, such as another smart phone.

As further described below, the remote server 106 and/or devices in the vehicle 102, such as the first device 114 and the second device 116, may be used in determining an indication of a location of the first device 114, and thus an indication of a location of the party associated with the first device 114 (e.g., that the party is the driver, as illustrated by the association of the first device 114 with the driver 110 (e.g., the possession of the first device 114 by the driver 110)). The remote server 106 and/or devices in the vehicle 102 may also be used in determining an indication of a location of another device(s), such as the third device 122, and thus an indication of a location of a party or parties associated with such other device(s).

Figure 2:
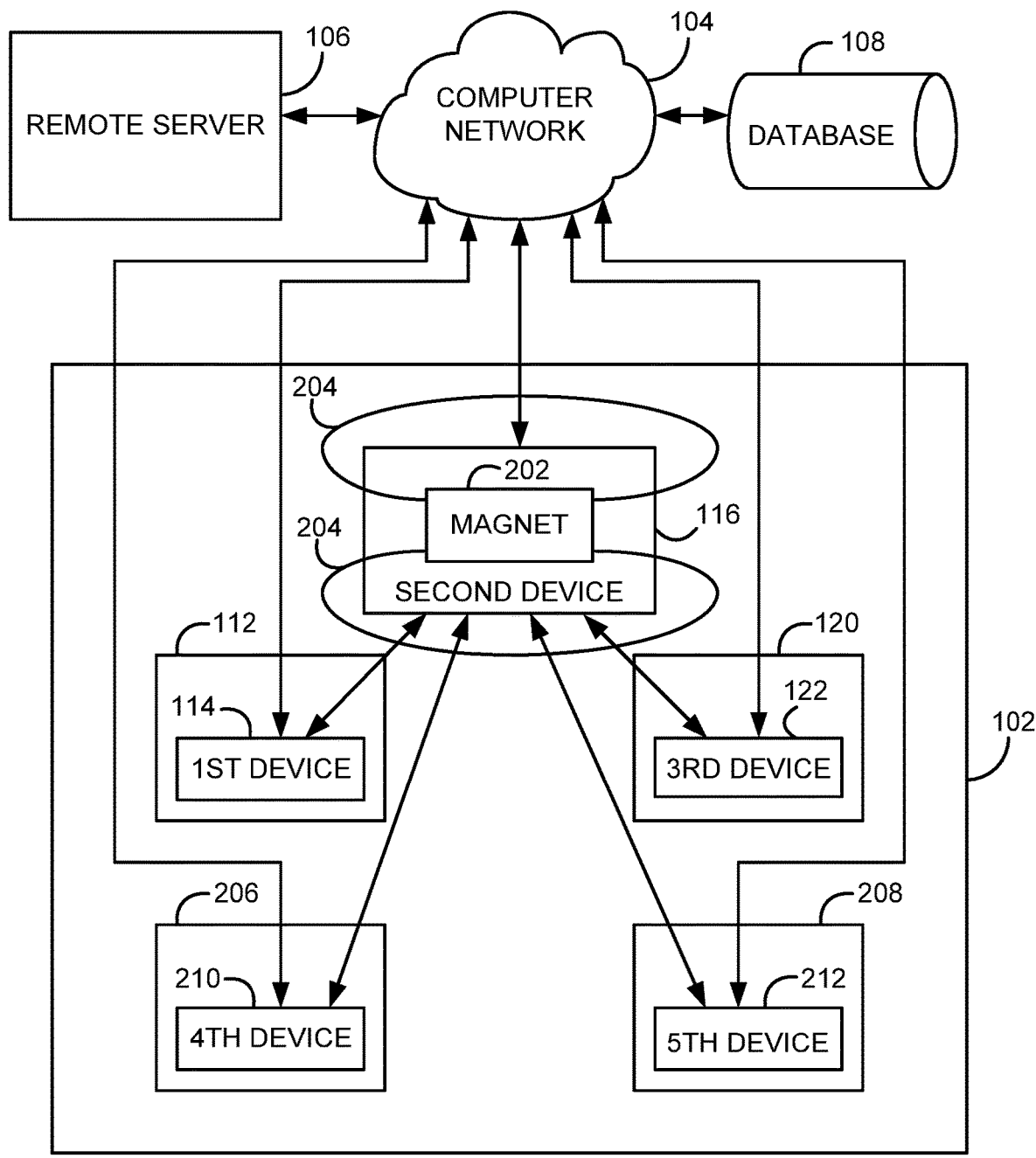
FIG. 2 illustrates another view showing further detail of the example system of FIG. 1.

FIG. 2 illustrates another (e.g., overhead) view showing further detail of the example system 100. As shown in FIG. 2, the second device 116 may include a magnet 202 that may transmit a signal 204, as shown by the illustrative magnetic field lines emanating from the magnet 202. FIG. 2 also illustrates two rear passenger seats in the vehicle 102; namely, a left rear passenger seat 206 in which an additional passenger (not shown for simplicity of illustration) may sit, and a right rear passenger seat 208 in which another additional passenger (also not shown) may sit. A fourth device 210 (e.g., smart phone) and a fifth device 212 (e.g., smart phone) may be associated with the additional passenger in the left rear passenger seat 206 and the other additional passenger in the right rear passenger seat 208, respectively. It will be appreciated that the view of the example system 100 shown in FIG. 2, and the details therein, are by way of example only, and that numerous variations may be implemented. As just several examples, any suitable number and arrangement of seats may be implemented; any suitable number, distribution, and/or association(s) of devices with passengers may be implemented; some seats may be unoccupied, etc. More particularly, for example, some devices may not be present, e.g., only the first device 114 may be present and not the third, fourth, and fifth devices 122, 210, and 212; and the driver 110 with whom the first device 114 is associated may be the only party in the vehicle 102. Additionally, the first, third, fourth, and fifth devices 114, 122, 210, and 212, and each computing device described herein, such as the remote server 106 as well, may be or may include any suitable computing device(s), such as but not limited to one or more desktop computers; laptop computers; mobile phones such as smart phones, tablets, and/or phablets; smart glasses; other wearable computing device(s), etc.

As further shown in the example of FIG. 2, each of the first device 114, the third device 122, the fourth device 210, and the fifth device 212 may be communicatively coupled to the computer network 104. The computer network 104 may also be communicatively coupled to the second device 116. In some embodiments, as also shown in FIG. 2, each of the first, third, fourth, and fifth devices 114, 122, 210, and 212 may be communicatively coupled to the second device 116 instead of or in addition to the devices 114, 122, 210, and 212 being communicatively coupled to the computer network 104; or instead of or in addition to the computer network 104 being communicatively coupled to the second device 116.

It will be understood that while the first, third, fourth, and fifth devices 114, 122, 210, and 212 are shown and described herein as being associated with the driver seat 112, the front passenger seat 120, the left rear passenger seat 206, and the right rear passenger seat 208, respectively, the devices 114, 122, 210, and 212 need not have these associations with the seats in the vehicle 102. The devices 114, 122, 210, and 212 may be associated with different seats; one or more of the devices 114, 122, 210, and 212 may not be associated with any particular seat in the vehicle 102; more or fewer seats and/or devices may be included in the vehicle 102, etc. Additionally, the determinations of the indication(s) of the location(s) of device(s) in the vehicle 102, which are described in greater detail below, may be made without any prior knowledge of the location(s) of the device(s) in the vehicle 102, other than, for example, the general knowledge that the device(s) are somewhere in the vehicle 102 (e.g., as determined based on a suitable telematics application, Global Positioning System (GPS) receivers of the device(s) and the vehicle 102, input by a party/parties associated with the device(s), or in any other suitable manner).

Figure 3A:
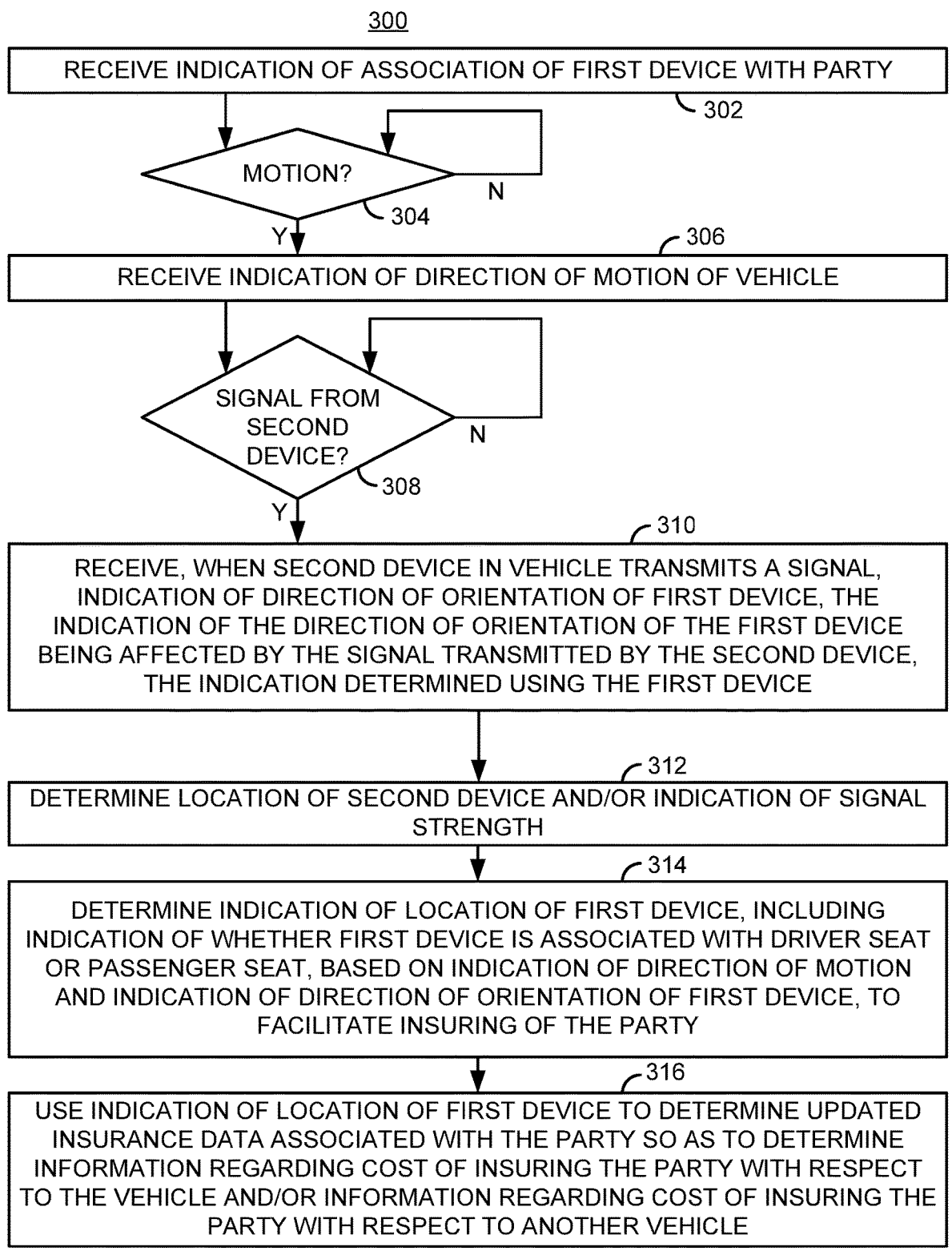
FIG. 3A is a flow chart of an example method, routine, or process for determining an indication of a location of a device in a vehicle.

III. Example Methods for Determining Indication of Location of Device in Vehicle Associated with a Party in Vehicle FIG. 3A is a flow chart of an example method, routine, or process 300 for determining an indication of a location of a device in a vehicle, such as an indication of a location of the first device 114 in the vehicle 102. The example method, routine, or process 300 may be used to determine the indication of the location of the first device 114 in the vehicle 102 when, for example, it is assumed that the first device 114 is oriented in the direction of motion of the vehicle 102. It will be appreciated that under such an assumption, outputs of a magnetometer of the first device 114 and in some cases an accelerometer of the first device 114 may indicate a direction of orientation of the first device 114 that is the same as the direction of motion of the vehicle 102 in the absence of a signal transmitted by the second device 116. Additionally or alternatively, the example method, routine, or process 300 may be used when, for example, sensors such as those used in a magnetometer and/or accelerometer of the first device 114 are suitably calibrated so that calculations, such as those described below, may be performed as though the first device 114 is oriented in the direction of motion of the vehicle 102 in order to determine the indication of the location of the first device 114 in the vehicle 102.

One or more processors, which may be one or more processors of the first device 114, such as a microprocessor(s) implemented as described below with respect to FIG. 7, may receive an indication of an association of the first device 114 with a party in the vehicle 102 (block 302). It will be understood, however, that for each of the actions described herein with respect to the example method, routine, or process 300 and other example method(s), routine(s), or process(es), the one or more processors may be one or more processors of one or more of the devices in the vehicle 102, such as the first device 114, and/or one or more processors of any other components in or of the vehicle 102, and/or one or more processors of the remote server 106, for example. The party in the vehicle 102 may be a customer (e.g., an insured) of an insurance provider.

The one or more processors may receive the indication of the association of the first device 114 with the party by receiving information generated or stored by the first device 114 or by another device(s) (e.g., one or more of the devices 122, 210, and/or 212) that identifies the party associated with (e.g., owning or possessing) the first device 114. Such generation or storage of identifying information may, in one example, be performed by an application executed by the first device 114, such as an application used for the purpose of determining the indication of the location of the first device 114 in the vehicle 102. Such an application may, in some embodiments, be downloaded to the first device 114 from the remote server 106 via the computer network 104. In some embodiments, data already stored in a memory of the first device 114 (e.g., prior to performing the example method, routine, or process 300) may indicate the association of the first device 114 with the party. It is noted that because an application executed by a device associated with a party (e.g., by the first device 114) may determine the indication of the location of the device in the vehicle 102 as described in further detail below, it will be understood that in some cases, a location(s) of a party/parties in the vehicle 102 may not be determined when that party/parties is/are not associated with any device(s) such as one or more of the devices 114, 122, 210, and/or 212. Similarly, a location(s) of the party/parties may not be determined when that party/ parties is/are associated with a device(s) but the application is not downloaded to the associated device(s) or the associated device(s) do/does not execute the application.

With continued reference to the actions described with respect to block 302, in still other embodiments, the one or more processors may receive the indication of the association of the first device 114 with the party from another source, including in some cases from another source via the computer network 104. For example, an agent of the insurance provider may send an indication of the association of the first device 114 with the party via the computer network 104 after initial binding of insurance coverage for the party with respect to the vehicle 102. The indication sent by the agent may be or may include, for example, an indication that an identifier, such as a phone number, of the first device 114 and a name of the party are considered by the insurance provider to be associated with one another. In still other embodiments, the indication of the association of the first device 114 with the party may be received by the one or more processors of the remote server 106 via the computer network 104 or, for example, by way of input to the remote server 106 through a user interface of the remote server 106 by an agent of the insurance provider.

The one or more processors may determine whether motion of the vehicle 102 is detected (block 304). Motion of the vehicle 102 may be detected using a speedometer of the vehicle 102, an accelerometer of the vehicle 102, speed and/or acceleration detection functionality of the first device 114, or via any other suitable device(s) and/or technique(s). An indication of a detection of motion of the vehicle 102 by a component of the vehicle 102 may be transmitted to the computer network 104 or to the first device 114 via any suitable technique. For example, the second device 116 may be or may include a BLUETOOTH® beacon that receives the indication of the detection of motion of the vehicle 102 from a component of the vehicle 102 and transmits the indication of the detection of motion of the vehicle 102 to the first device 114 and/or to the computer network 104. As shown in FIG. 3A, the example method, routine, or process 300 may remain at the determination described with respect to block 304 until it is determined that motion of the vehicle 102 is detected.

When it is determined that motion of the vehicle 102 is detected, the one or more processors may receive an indication of the direction of motion of the vehicle 102 (block 306). For example, the indication of the direction of motion of the vehicle 102 may be received by the one or more processors of the first device 114 based on, for example, outputs of a magnetometer and in some cases an accelerometer of the first device 114. More particularly, the indication of the direction of motion of the vehicle 102 may be received by executing an application by the first device 114, such as an application as described above that determines the indication of the location of the first device 114, where the application may receive and/or process outputs of the magnetometer and/or accelerometer. The indication of the direction of motion of the vehicle 102 may be displayed on a display screen of the first device 114 (e.g., smart phone) as a reading of a compass where the first device 114 executes a compass application, for example. In another embodiment, the indication of the direction of motion of the vehicle 102 may be received by the one or more processors of the first device 114 by receiving indications of a position of the first device 114 from a GPS receiver of the first device 114.

When the indication of the direction of motion of the vehicle 102 is received as described with respect to block 306, the first device 114 may cause the second device 116 to cause the magnet 202 to transmit the signal 204. By way of example, upon receipt of the indication of the direction of motion of the vehicle 102, the first device 114 may send a BLUETOOTH® signal to the second device 116, which may be or may include a BLUETOOTH® beacon. Such a BLUETOOTH® beacon may include the magnet 202, or the magnet 202 may be a separate piece of hardware within the second device 116. In any event, in the present example, the BLUETOOTH® signal received by the second device 116 may cause the second device 116 to activate, e.g., may cause a battery of the second device 116 to supply power so that the magnet 202 transmits the signal 204. The BLUETOOTH® signal sent by the first device 114 to the second device 116 may, in some embodiments, also cause the strength of the signal 204 transmitted by the magnet 202 to be adjusted, such as in a situation where an application executed by the first device 114 determined a low received strength of the signal 204 during a previous determination of an indication of a location of the first device 114 in the vehicle 102. It will be appreciated that the first device 114 need not transmit a BLUETOOTH® signal to cause the second device 116 to activate, and that any suitable signal from the first device 114 to the second device 116 may be used. In implementations where, for example, the second device 116 is already receiving power (e.g., connected to a receptacle that may be used for a cigarette lighter, as discussed below), the first device 114 may otherwise cause, in any suitable manner, the second device 116 to cause the magnet 202 to transmit the signal 204. However, in implementations where the second device 116 is not already receiving power and is caused to activate by the signal transmitted by the first device 114, it will be appreciated that the activation of the second device 116 and transmission of the signal 204 in response to the signal (e.g., BLUETOOTH® signal) from the first device 114 may advantageously minimize the amount of time power is being supplied to the second device 116. Thus, the life of a battery that powers the second device 116 may be prolonged, for example.

The one or more processors may determine whether a signal is being transmitted (e.g., broadcast) from the second device 116 (block 308). With reference to FIG. 2, in one embodiment the one or more processors of the first device 114 may determine whether the signal 204 transmitted by the magnet 202 is detected. In some implementations, the determination of whether the signal 204 is detected may be made based on whether an output(s) of the magnetometer and/or accelerometer of the first device 114 change by at least a threshold amount(s) as compared to the output(s) of the magnetometer and/or accelerometer that indicate the direction of motion of the vehicle 102, and/or that indicate a direction of orientation of the first device 114 unaffected by the signal 204. As shown in FIG. 3A, the example method, routine, or process 300 may remain at the determination described with respect to block 308 until it is determined that the signal 204 is being transmitted.

When it is determined that a signal, such as the signal 204, is transmitted, the one or more processors may receive an indication of a direction of orientation of the first device 114, where the indication of the direction of orientation of the first device 114 is affected by the signal 204 (block 310). The indication of the direction of orientation of the first device 114 may be received by the one or more processors of the first device 114 based on, for example, a determination of the indication of the direction of orientation of the first device 114 using the one or more processors of the first device 114 based on outputs of the magnetometer, and in some cases an accelerometer, of the first device 114 as affected by the signal 204. More particularly, as described above with respect to the indication of the direction of motion of the vehicle 102, the indication of the direction of orientation of the first device 114 may be received by executing an application by the first device 114, where the application may receive and/or process outputs of the magnetometer and/or accelerometer. The indication of the direction of orientation of the first device 114 may also be displayed on a display screen of the first device 114 as, for example, a reading of a compass. For example, a magnetometer of the first device 114 may be affected by the signal 204 so that the magnetometer indicates that "north" is toward the second device 116 when the second device 116 transmits the signal 204.

The one or more processors may determine a location of the second device 116 and/or an indication of a strength of the signal 204 (block 312). In one embodiment, the location of the second device 116 may already be known prior to carrying out the example method, routine, or process 300 and information indicative of this location may have already been provided to the first device 114. For example, as shown in FIG. 1, the second device 116 may be attached to the bottom of a rearview mirror of the vehicle 102, and information indicative of this location may have been provided to the first device 114 by, for example, the remote server 106 via the computer network 104. As another example, the second device 116 may be connected to an On-board diagnostics (OBD) port (not shown) of the vehicle 102, and this location may also already be known. In yet another example, the second device 116 may be plugged into a receptacle in the vehicle 102, such as a receptacle that may also be used for a cigarette lighter.

In other embodiments, where the location of the second device 116 is not already known, the determination of the location of the second device 116 may be performed by assuming the location of the second device 116. For example, the location of the second device 116 may be assumed by an application such as that described above with respect to block 302 (e.g., by the application executing based on the assumed location of the second device 116). More particularly, in one embodiment, the second device 116 may be assumed to be attached to the bottom of the rearview mirror of the vehicle 102 as in the example of FIG. 1.

In still other embodiments, where the location of the second device 116 is not already known, one or more additional indications of one or more additional directions of orientation may be used in determining the location of the second device 116, as more fully described with respect to FIG. 5. Generally speaking, such an additional indication(s) will be received from an additional device(s) such as the third device 122, the fourth device 210, and/or the fifth device 212, as also more fully described with respect to FIG. 5.

With continued reference to the actions described with respect to block 312, when an indication of a strength of the signal 204 (e.g., magnetic signal) is determined, this indication may be determined by, for example, the one or more processors of the first device 114 as an indication of a received strength of the signal 204 at the first device 114. A strength of the signal 204 as transmitted by the magnet 202 may also be known prior to carrying out the example method, routine, or process 300, or may be made known by, for example, the remote server 106 transmitting an indication of the strength of the signal 204 as transmitted by the magnet 202 to the computer network 104 for transmission to the first device 114. In some embodiments, the strength of the signal 204 as transmitted by the magnet 202 may be adjustable, such as by way of a signal from the first device 114 as discussed above, or by way of a command received from the remote server 106 (e.g., as input to the remote server 106 via a user interface) via the computer network 104. The strength of the signal 204 as transmitted by the magnet 202 may be high enough, and/or may be adjustable so as to be high enough, so as to affect the indication of the direction of orientation of the first device 114 (e.g., so that the indication of the direction of orientation indicates that "north" is in the direction of the second device 116, as discussed above).

The one or more processors may determine an indication of a location of the first device 114, including an indication of whether the first device 114 is associated with the driver seat 112 or a passenger seat (e.g., one of the passenger seats 120, 206, or 208), to facilitate insuring of the party associated with the first device 114 (block 314). More particularly, the one or more processors may determine the indication of the location of the first device 114 based on the indication of the direction of motion of the vehicle 102 and based on the indication of the direction of orientation of the first device 114. In one example, the indication of the direction of motion of the vehicle 102 may be an indication that the vehicle 102 is traveling north (e.g., in a compass direction of 0 degrees), and the second device 116 including the magnet 202 may be positioned in front of the first device 114 and 45 degrees to the right of the first device 114. Additionally, the indication of the direction of orientation of the first device 114 may be northeast (e.g., in a compass direction of 45 degrees) due to the influence of the signal 204 transmitted by the magnet 202. As such, it may be determined that a first relative direction of the second device 116, which may be (i) the direction to the second device 116 from the first device 114 relative to (ii) the direction of motion of the vehicle 102, is northeast (e.g., in a compass direction of 45 degrees). In an embodiment where the determination of the location of the second device 116 (as described with respect to block 312) is not performed and the second device 116 is, for example, assumed to be attached to the bottom of the rearview mirror of the vehicle 102 as in FIG. 1, the one or more processors may accordingly determine that the first device 114 is located behind and to the left of the second device 116. In one implementation, the one or more processors may thus determine the indication of the location of the first device 114 to include an indication that the first device 114 is associated with the driver seat 112 and, thus, that the party associated with the first device 114 is the driver 110 of the vehicle 102.

Thus, it will be understood that determining the indication of the location of the first device 114 in the vehicle 102 may include determining the first relative direction of the second device 116 in this manner and determining the indication of the location of the first device 114 based on the first relative direction of the second device 116. Similarly, in the discussion below of determining an indication(s) of a location(s) of an additional device(s) in the vehicle 102, it will be understood that determining such an indication(s) of a location(s) of an additional device(s) may include determining an additional relative direction(s) of the second device 116 as described below, and determining such an indication(s) of a location(s) of an additional device(s) based on the additional relative direction(s) (and/or based on the first relative direction in some cases, for greater accuracy in determining such an indication(s) of a location(s) of an additional device(s)). It will also be appreciated from the above discussion that where, for example, the actual direction of orientation of the first device 114 is the same as the direction of motion of the vehicle 102, the first relative direction of the second device 116, and thus the indication of the location of the first device 114, may be determined as discussed above by determining a change in output of a magnetometer of the first device 114 as a result of the signal 204 being transmitted.

In another embodiment, the one or more processors may determine the indication of the location of the first device 114 more accurately such that this indication indicates that the first device 114 is associated with the driver seat 112 if the first relative direction of the second device 116 is at least a threshold angle (e.g., a compass angle of 40 degrees or any suitable amount). The one or more processors may operate such that the indication of the location of the first device 114 indicates that the first device 114 is associated with the left rear passenger seat 206 if the first relative direction of the second device 116 is less than that threshold amount. This operation may occur because if the first device 114 were to be positioned in the left rear passenger seat 206 (such positioning not being illustrated), the corresponding compass angle would, in the example where the second device 116 is attached to the bottom of the rearview mirror, be less than the compass angle when the first device 114 is in the driver seat 112 due to greater distance of the left rear passenger seat 206 from the location of the second device 116.

Correspondingly, the one or more processors may operate such that the indication of the location of the first device 114 indicates that the first device 114 is associated with the front passenger seat 120 (such positioning not being illustrated) if the angle value of the first relative direction of the second device 116 is a negative amount which has an absolute value that is at least a negative threshold amount (e.g., a compass angle of −40 degrees—that is, 40 degrees to the left of a compass direction corresponding to the indication of the direction of motion of the vehicle—or any suitable amount). The one or more processors may also operate such that the indication of the location of the first device 114 indicates that the first device 114 is associated with the right rear passenger seat 208 (such positioning not being illustrated) if the angle value of the first relative direction of the second device 116 is a negative amount which has an absolute value that is less than the negative threshold amount.

It will be appreciated that because, as noted above, the vehicle 102 may include different interior configurations, such as configurations including more or fewer seats and/or different relative positioning of seats, the thresholds as described above may vary with each possible configuration. Such thresholds may be preset in an application executed by the first device 114, such as an application used for the purpose of determining the indication of the location of the first device 114 in the vehicle 102 as described above. Depending on the type of the vehicle 102 as determined, for example, when the party applies to the insurance provider for an insurance policy with respect to the vehicle 102, either the party or the insurance provider may configure the application to use a particular threshold(s) preset in the application when the application subsequently executes to determine the location of the first device 114 in the vehicle 102. In other embodiments, for example, such thresholds may be determined by or at the remote server 106 (e.g., by an agent of the insurance provider), and may be downloaded to the first device 114 once the insurance provider is aware of the type of the vehicle 102 and, consequently, the interior configuration of the vehicle 102.

Figure 4:
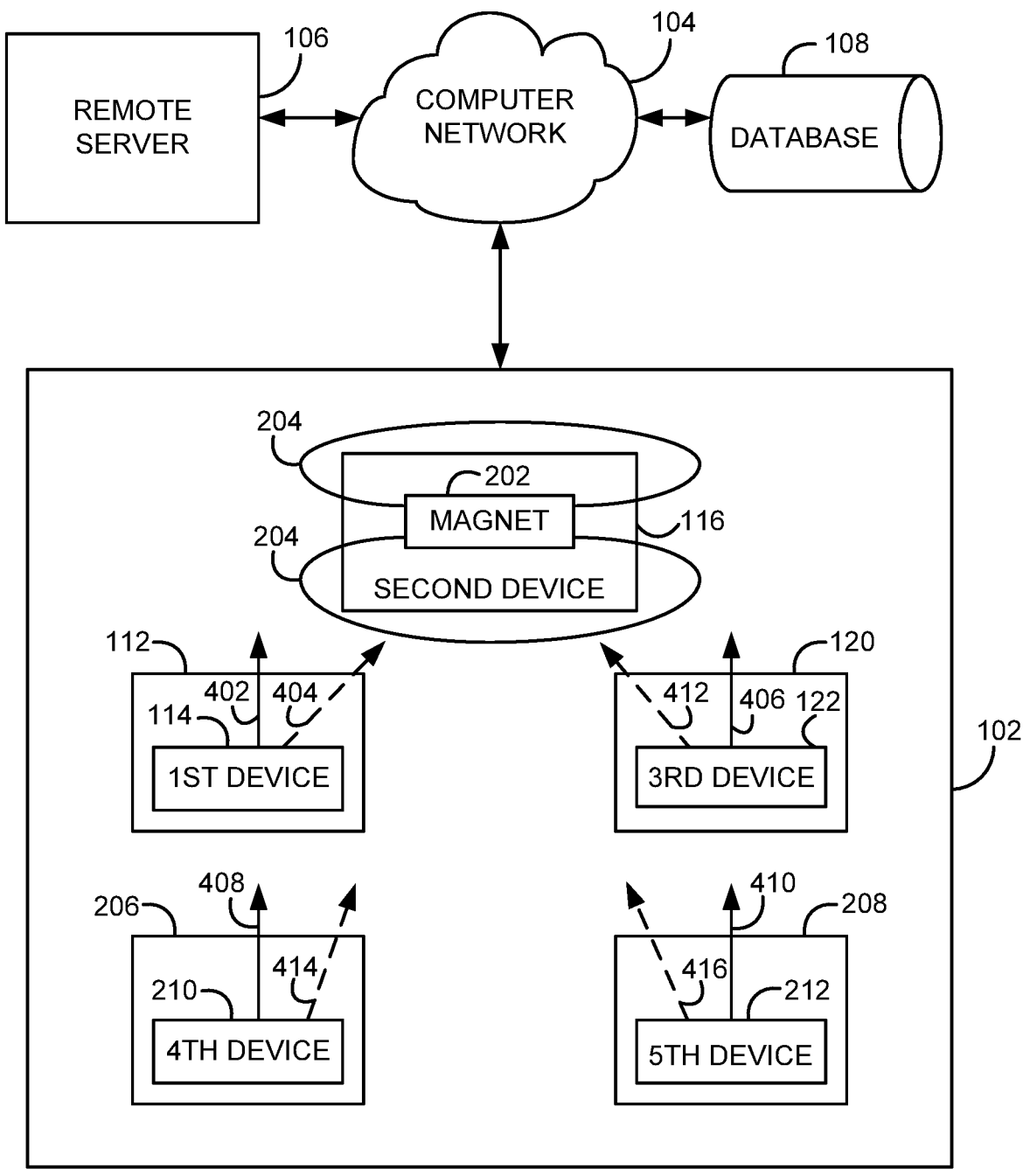
FIG. 4 illustrates yet another view of detail of the example system of FIG. 1.

With continued reference to the actions described with respect to block 314 and with reference to FIG. 4, FIG. 4 illustrates yet another view of detail of the example system 100 and an example of the indicated direction of motion of the vehicle 102 and the indicated direction of orientation of the first device 114. In particular, a representative arrow 402 emanating from the first device 114 points in the indicated direction of motion of the vehicle 102 (e.g., unaffected by the signal 204 where the direction of motion is determined using, for example, a magnetometer). A representative arrow 404 emanating from the first device 114 points in the indicated direction of orientation of the first device 114 as affected by the signal 204, where the signal 204 may be received as described with respect to block 310. The representative arrow 404 is shown with a dashed line to illustrate that the representative arrow 404 points in the indicated direction of orientation of the first device 114 as opposed to the indicated direction of motion of the vehicle 102.

In the example of FIG. 4, the representative arrow 404 may point 45 degrees to the right of the direction in which the representative arrow 402 points (with FIG. 4, and other device and system figures herein, not being shown with exact dimensioning or other measurements). Because, in the example of FIG. 4, the indicated direction of orientation of the first device 114 differs from the indication of the direction of motion of the vehicle 102 by more than 40 degrees, per the example described above, it may be determined with respect to block 314 that the first device 114 is associated with the driver seat 112 and, thus, that the party associated with the first device 114 is the driver 110 of the vehicle 102. Additional description with respect to FIG. 4, including description of the additional representative arrows 406-416, is provided below in conjunction with the description of, for example, FIG. 5.

With still further reference to the actions described with respect to block 314, it is to be understood that when the actions described with respect to block 312 are performed during performance of the example method, routine, or process 300, the indication of the location of the first device 114 may correspondingly be determined further based on the location of the second device 116 and/or the indication of the strength of the signal 204. For example, the indication of the strength of the signal 204 as received at the first device 114, where an indication of the strength of the signal 204 as transmitted by the magnet 202 is known, may in some situations be used to improve the accuracy of determining a distance of the first device 114 from the magnet 202. Consequently, the accuracy of determining whether the first device 114 is in one of the front seats 112 or 120 of the vehicle 102, or in one of the rear seats 206 or 208 of the vehicle 102, may in some situations be improved. Such an improvement may be particularly useful in an implementation where, for example, the second device 116 is located approximately directly in front of the driver seat 112, such as when the second device 116 is connected to the OBD port of the vehicle 102. In such an implementation, the indication of the direction of orientation of the first device 114 may indicate, for both the driver seat 112 and the left rear passenger seat 206, that the second device 116 is straight ahead, e.g., in generally the same direction as the indicated direction of motion when the vehicle 102 is traveling straight ahead. However, use of the indication of the strength of the signal 204 as received by the first device 114, where the indication of the strength of the signal 204 as transmitted by the magnet 202 is known, may be used in determining whether the first device 114 is associated with the driver seat 112 or associated with the left rear passenger seat 206.

An alternative solution to the OBD problem where, for instance, the driver seat 112 and the back left passenger seat 206 are associated with the same indication of a direction of orientation of the first device 114, would be to add an additional device (not shown) with a magnet inside the vehicle 102. The additional device may be similar to the second device 116. This additional device may help to improve the accuracy of the determination of the indication of the location of the first device 114 by allowing an additional indication or indications of an additional direction(s) of orientation to be determined. The additional device may, for example, be on the opposite side of the vehicle from the second device 116. Thus, for example, where the second device 116 is connected to the OBD port of the vehicle 102 (the OBD port being, for example, on a left side of the vehicle 102), the additional device may be attached to a suitable location on a right side of the vehicle 102.

The indication of the location of the first device 114 may be used, e.g., by one or more processors of the remote server 106, to determine updated insurance data associated with the party so as to determine information regarding a cost of insuring the party with respect to the vehicle 102 and/or with respect to another vehicle (block 316). Such updated insurance data may include any suitable information useful to the insurance provider for rating purposes with respect to the party, thereby allowing the insurance provider to more accurately estimate insurance risk with respect to the party, and in particular with respect to the party when the party is driving the vehicle 102. Consequently, the insurance provider may more accurately determine appropriate pricing and/or terms of insurance coverage, such as, for example, deductible, premium, coverage limits, available discounts if any, etc.

By way of example, the updated insurance data described with respect to block 316 may include an association between the party and any suitable additional data regarding the vehicle 102 and/or telematics data regarding the driving of the vehicle 102 (e.g., times of day during drives (i.e., trips), speeds during drives, lengths of drives, locations of the vehicle 102 during drives, etc.). That is, in some embodiments, the party may be associated with such additional data for the individual drives of the vehicle 102 for which it has been determined, by determining that the first device 114 is associated with the party and has been determined to be located in the driver seat 112, that the party was, or likely was (e.g., based on an assumption that the party associated with the first device 114 was in possession of the first device 114), the driver of the vehicle 102. The association of the party with such additional data for drives for which the party was the driver of the vehicle 102 may constitute all or part of the updating of insurance data associated with the party. The updating of the insurance data associated with the party may be used in any suitable manner by the insurance provider to determine a rate or rate classification, for example, for the party, so as to more accurately determine appropriate pricing, terms of insurance coverage, etc. Additionally, the updating of the insurance data associated with the party, by virtue of indicating factors such as a level of insurance risk with respect to the party, may allow determination of appropriate pricing, terms of insurance coverage, etc. for the party if the party wishes to obtain an insurance policy for driving of a vehicle other than the vehicle 102. Thus, determination of appropriate pricing, terms of insurance coverage, etc. may be more accurately facilitated when the party purchases a new vehicle or simply wishes to be insured with respect to a vehicle other than or in addition to the vehicle 102.

As will be apparent from the above description, and as should be appreciated with respect to all examples presented in this disclosure, various ones of the functions or operations shown in FIG. 3A are optional. As just one example, the actions described with respect to block 312 may not be performed in some embodiments. That is, in some embodiments, the location of the second device 116 may not be determined, such as in cases where the location of the second device 116 is already known or is assumed, as discussed above, and an indication of a strength of the signal 204 may not be determined. Furthermore, the functions or operations shown in FIG. 3A (and each flow chart herein) may be performed in any suitable order, any desired number of times, and/or with any suitable variation to the particular order and/or combination shown so as to achieve a desired result, such as a desired manner of determining an indication of a location of a device in a vehicle (e.g., an indication of a location of the first device 114 in the vehicle 102).

Figure 3B:
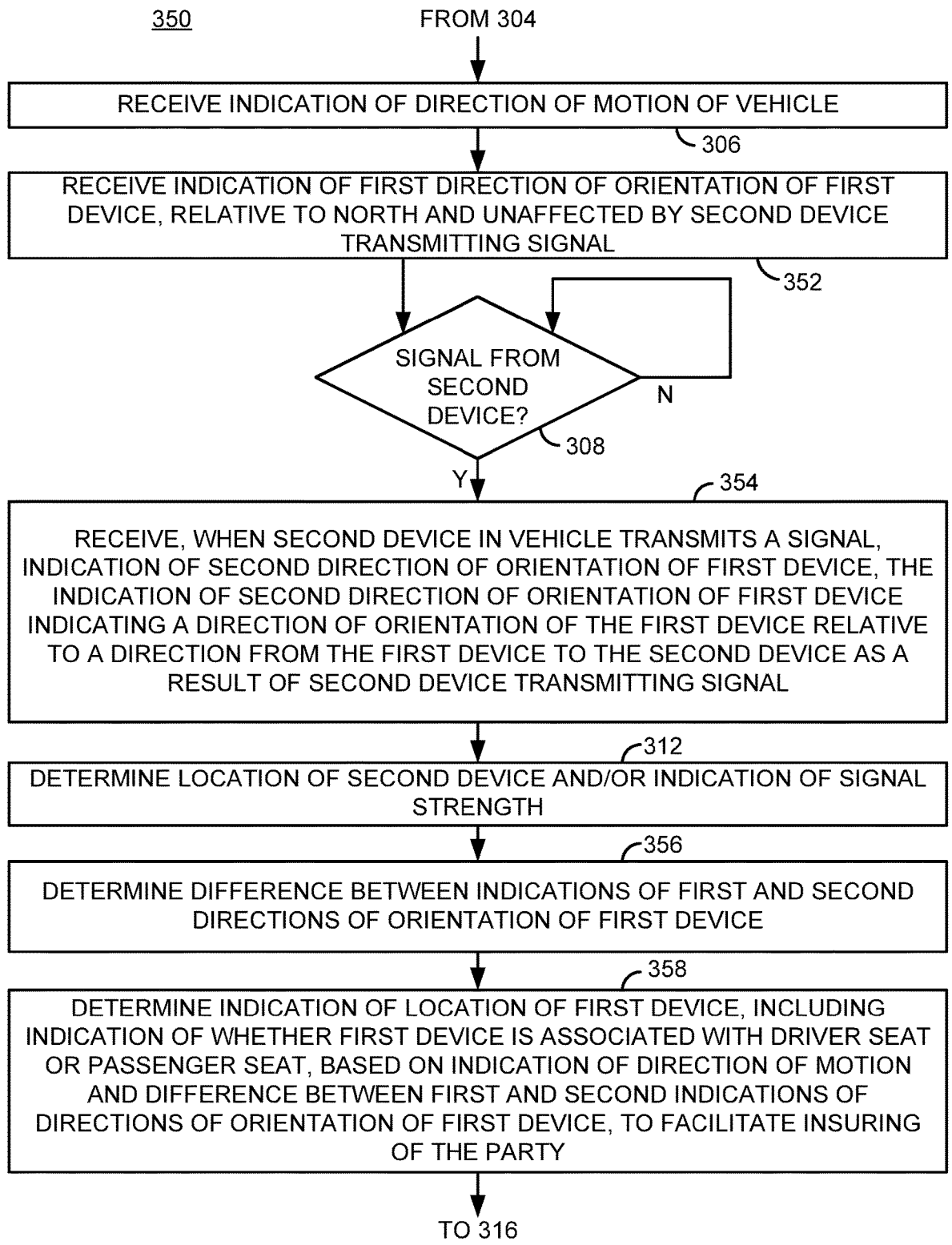
FIG. 3B is a flow chart of another example method, routine, or process for determining an indication of a location of a device in a vehicle.

FIG. 3B is a flow chart of another example method, routine, or process 350 for determining an indication of a location of a device in a vehicle, such as an indication of a location of the first device 114 in the vehicle 102. The example method, routine, or process 350 may be used to determine the indication of the location of the first device 114 in the vehicle 102 when, for example, the first device 114 is not oriented in the direction of motion of the vehicle 102, and/or when it cannot be assumed (or calculations may not be performed as though) the first device 114 is oriented in the direction of motion of the vehicle 102.

As will be understood from FIG. 3B, the example method, routine, or process 350 may include performing the actions described with respect to blocks 302 and 304. The example method, routine, or process 350 may also include performing the actions described with respect to block 306 to receive an indication of a direction of motion of the vehicle 102, such as by way of use of a magnetometer and/or accelerometer of the first device 114, GPS capability of the vehicle, and/or any suitable technique(s) as described above.

As further shown in FIG. 3B, one or more processors, which may be the one or more processors of the first device 114, may receive an indication of a first direction of orientation of the first device 114, relative to north and unaffected by the second device 116 transmitting the signal 204 (block 352). This indication of the first direction of orientation of the first device 114 may be received based on, for example, an output of a magnetometer of the first device 114. More specifically, the indication of the first direction of orientation of the first device 114 relative to north may be relative to true north. Additionally, this indication may not be a direct indication relative to north or true north; that is, the indication may, for example, directly indicate the first direction of orientation of the first device 114 relative to any suitable direction, and the first direction of orientation of the first device 114 relative to north (e.g., true north) may thus be indirectly indicated. In any event, by performing the actions described with respect to blocks 306 and 352, the indication of the first direction of orientation of the first device 114 and thus a difference between the indicated first direction of orientation of the first device 114 relative to north (e.g., true north) and the indicated direction of motion of the vehicle 102 relative to north (e.g., true north) may be known.

As in the example method, routine, or process 300, the example method, routine, or process 350 may also include determining whether a signal (e.g., the signal 204) is being transmitted (e.g., broadcast) from the second device 116 as shown and described with respect to block 308.

The one or more processors may receive, when the second device 116 transmits the signal 204, an indication of a second direction of orientation of the first device 114 (block 354). The indication of the second direction of orientation of the first device 114 may indicate the direction of orientation (e.g., actual orientation) of the first device 114 relative to the direction from the first device 114 to the second device 116, and the indication of the second direction of orientation may indicate this direction as a result of the second device 114 transmitting the signal 204. The indication of the second direction of orientation of the first device 114 may be based on the indication of the first direction of orientation of the first device 114 so that the indication of the second direction of orientation of the first device 114 accounts for the difference between the actual direction of orientation of the first device 114 and the indicated direction of motion of the vehicle 102. The indication of the second direction of orientation of the first device 114 is further discussed below, such as with respect to FIG. 8.

Figure 8:
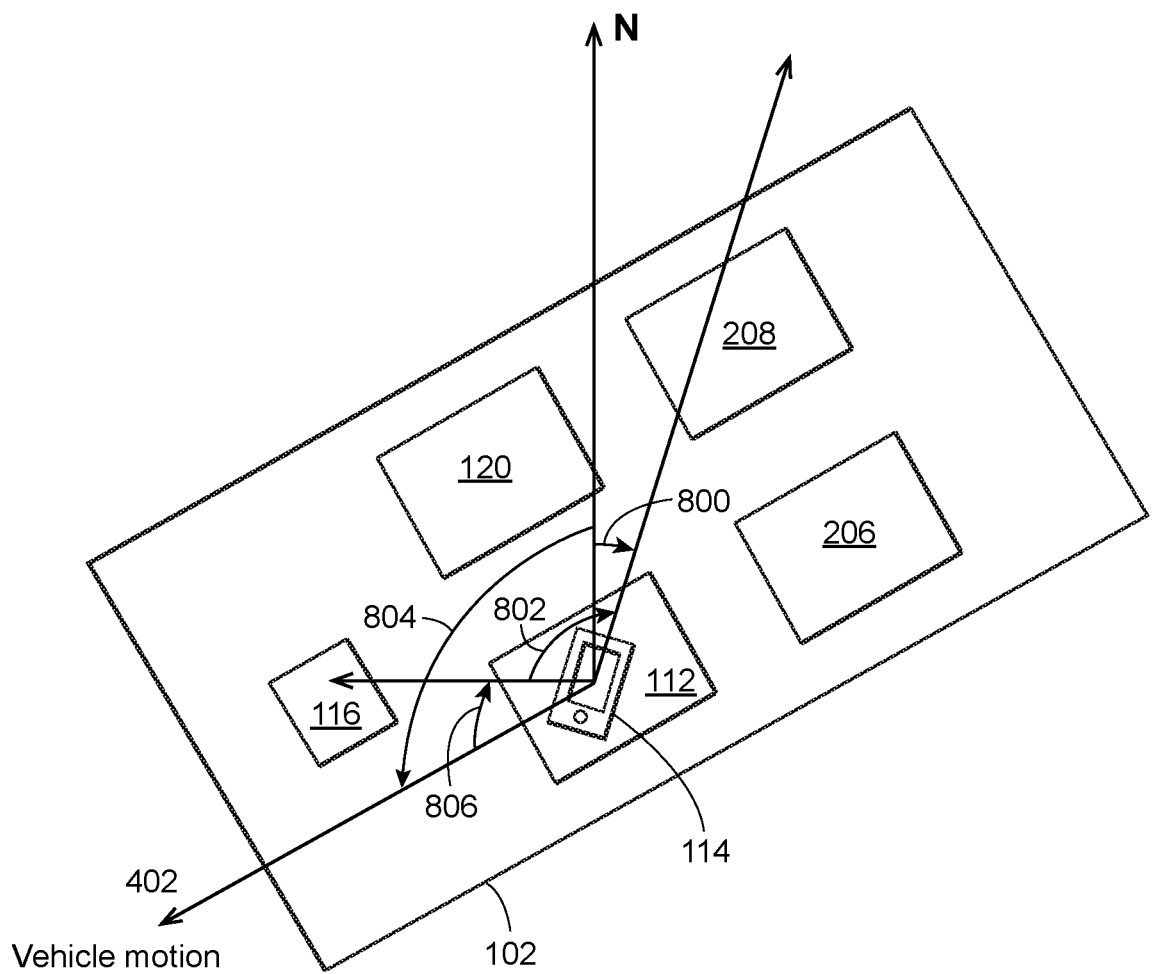
FIG. 8 illustrates a vehicle with a direction of orientation of a first device in the vehicle that is different from a direction of vehicle motion, and illustrates an example use of various directions and angles in determining a location of the first device in the vehicle.

Turning briefly to FIG. 8, FIG. 8 illustrates an example of the vehicle 102 where the first device 114 is not oriented in the indicated direction of motion of the vehicle 102. The first direction of orientation of the first device 114, relative to north and unaffected by the signal 204, may correspond to the angle 800 shown in FIG. 8. The second direction of orientation of the first device 114 (e.g., as noted above, corresponding to the direction of actual orientation of the first device 114 relative to the direction from the first device 114 to the second device 116) may correspond to the angle 802 shown in FIG. 8. The indication of the direction of motion of the vehicle 102 may also be relative to north, as with the indication of the first direction of orientation of the first device 114, and may thus correspond to the angle 804 shown in FIG. 8. Use of the angles 800, 802, and 804 to determine the indication of the location of the first device 114 in the vehicle 102 is further described below.

The one or more processors may determine the location of the second device 116 and/or the indication of signal strength as discussed above with respect to block 312.

The one or more processors may determine a difference between the indication of the first direction of orientation of the first device 114 and the indication of the second direction of orientation of the first device 114 (block 356). The one or more processors may also determine the indication of the location of the first device 114 in the vehicle 102, including the indication of whether the first device 114 is associated with the driver seat 112 or a passenger seat, based on the indication of the direction of motion of the vehicle 102 and based on the indications of the first and second directions of orientation of the first device 114 (e.g., based on the difference determined with respect to block 356) (block 358). In one embodiment, the one or more processors may determine the first relative direction of the second device 116, which as noted above may be (i) the direction of the second device 116 from the first device 114 relative to (ii) the direction of motion of the vehicle 102, by the following equation:

First relative direction=abs(direction of motion of vehicle 102)−abs(first direction of orientation of first device 114−second direction of orientation of first device 114)

Thus, returning to the example of FIG. 8, the first relative direction of the second device 116 may be equal to the absolute value of the angle 804 minus the absolute value of the difference between the angles 800 and 802, where north may represent an angle of zero degrees, positive angles may be to the east of north, and negative angles may be to the west of north. As such, the first relative direction may be determined as the angle 806 shown in FIG. 8. In the illustration of FIG. 8, the angle 806 may correspond to a northeast relative direction, and a determination of the location of the first device 114 may be made accordingly as discussed above with respect to FIG. 3A—and may depend on factors such as whether the determination(s) described with respect to block 312 has/have been made, as also discussed above with respect to FIG. 3A. Moreover, in some embodiments where it is known, assumed, or determined (e.g., by the first device 114) that the second device 116 is significantly higher or lower than the first device 114, the above equation may be suitably expanded to accommodate and determine three-dimensional values, such as a three-dimensional first relative direction.

As shown in FIG. 3B, the one or more processors may also perform the actions described with respect to block 316 in response to determining the indication of the location of the first device 114 in the vehicle 102 as described with respect to block 358.

IV. Example Method for Determining Indication of Location of at Least One Additional Device in Vehicle Associated with at Least One Additional Party in Vehicle Before providing additional description with respect to FIG. 4, reference is made to FIG. 5. FIG. 5 is a flow chart of an example method, routine, or process 500 for determining an indication of a location of at least one additional device in a vehicle, such as indications of locations of the third device 122, the fourth device 210, and the fifth device 212 in the vehicle 102. As noted below, one or more processors may perform or be used in performing various ones of the actions described with respect to FIG. 5. Where the example method, routine, or process 500 is performed by and/or using the example system 100, the one or more processors may be any suitable combination of, for example, one or more processors of the first, third, fourth, and/or fifth devices 114, 122, 210, and/or 212; one or more processors of the remote server 106; and/or one or more processors of the second device 116.

As noted above, while the first, third, fourth, and fifth devices 114, 122, 210, and 212 are described herein as being associated with the driver seat 112, the front passenger seat 120, the left rear passenger seat 206, and the right rear passenger seat 208, respectively, the devices 114, 122, 210, and 212 need not have these associations with the seats in the vehicle 102. For example, as noted above, more or fewer devices and/or seats may be included in the vehicle 102. For instance, only the first device 114 may be in the vehicle 102, and the first device 114 may be associated with the front passenger seat 120 rather than with the driver seat 112, with no device being associated with the driver seat 112. Many other permutations of devices and seat associations are possible as well. As also noted above, the determinations of the indication(s) of the location(s) of device(s) in the vehicle 102 may be made without any prior knowledge of the location(s) of the device(s) in the vehicle 102, other than, for example, the general knowledge that the device(s) are somewhere in the vehicle 102.

The one or more processors may receive an indication of an association of at least a third device with at least a second party in the vehicle 102, where the at least the third device may in this example be considered to include the third device 122, the fourth device 210, and the fifth device 212 (block 502). The at least the second party may include, in this example, the front passenger 118 seated in the front passenger seat 120, as well as passengers seated in the left rear passenger seat 206 and the right rear passenger seat 208. For each association of one of the at least the third device with one of the at least the second party, the indication of the association may be received in a way similar to any of the example ways described with respect to block 302.

The one or more processors may receive at least one of: (i) at least one indication, unaffected by the signal 204, of at least one first direction of orientation of the at least the third device, relative to north (e.g., true north), or (ii) when the second device 116 transmits the signal 204, at least one indication of at least one second direction of orientation of the at least the third device (block 504). For example, where it is assumed or known that each of the at least the third device is or may be treated as being oriented in the same direction as the direction of motion of the vehicle 102 (e.g., as discussed above with respect to FIG. 3A), the at least one indication of the at least one first direction of orientation need not be received, similar to the discussion above with respect to FIG. 3A.

Each of the at least one indication of the at least one second direction of orientation of the at least the third device may be affected by the signal 204 and may correspond to a respective one of the at least the third device (e.g., may correspond to a respective one of the devices 122, 210, and 212). Each of the at least one indication of the at least one second direction of orientation of the at least the third device may be determined by the corresponding one of the at least the third device. Each indication of a second direction of orientation of a corresponding one of the at least the third device may differ from a corresponding indication of a corresponding first direction of orientation of the corresponding one of the third device as a result of the transmission of the signal 204. Additionally, in embodiments including those where one of the at least the third device is not oriented in the same direction as the indicated direction of motion of the vehicle 102, the corresponding indication of the second direction of orientation may indicate the direction of orientation (e.g., actual orientation) of the corresponding third device relative to the direction from the corresponding third device to the second device 116. Each indication of a second direction of orientation of one of the at least the third device may be received in a way similar to that described with respect to receipt of the indication of the second direction of orientation of the first device 114 (e.g., as described with respect to block 354), for example.

With continued reference to the actions described with respect to block 504, and turning also to FIG. 4, representative solid-lined arrows 406, 408, and 410 are shown emanating from the third device 122 associated with the front passenger seat 120, the fourth device 210 associated with the left rear passenger seat 206, and the fifth device 212 associated with the right rear passenger seat 208 (such associations being by way of example only, as noted above). The representative arrows 406, 408, and 410 may point in indicated first directions of motion of the vehicle 102 (e.g., unaffected by the signal 204) as determined and/or received with respect to the third, fourth, and fifth devices 122, 210, and 212, respectively. FIG. 4 also shows representative dashed-line arrows 412, 414, and 416 pointing in indicated second directions of orientation of the third device 122, the fourth device 210, and the fifth device 212, respectively, as affected by the signal 204.

The one or more processors may determine at least one of: (i) a location of the second device 116, or (ii) for the first device 114 and/or at least one of the at least the third device, a corresponding indication(s) of a strength of the signal 204 (block 506). The one or more processors may determine the location of the second device 116 based on, for example, the first relative direction of the second device 116, and/or based on at least one of a second, third, or fourth relative direction of the second device 116 (associated with the third device 122, the fourth device 210, or the fifth device 212, respectively). The first relative direction of the second device 116 may be determined as described above. Each of the second, third, and/or fourth relative directions of the second device 116 may be determined in a similar manner using the indication of the direction of motion, the indication of the corresponding first direction of orientation of the corresponding one of the at least the third device, and/or the indication of the corresponding second direction of orientation of the corresponding one of the at least the third device.

For example, the one or more processors may use multiple relative directions of the second device 116, determined using multiple indications of the effect of the signal 204 transmitted by the magnet 202, to in some cases improve the accuracy of a determination of the location of the second device 116. In some cases, metal in the front of the vehicle 102 (e.g., associated with an engine block) and/or proximity of the devices 114, 122, 210, and/or 212 to one another may cause distortion of one or more of the aforementioned indications of the direction(s) of motion and/or direction(s) of orientation corresponding to the devices 114, 122, 210, and/or 212. As such, not all such indications may result in an indication of the same location of the second device 116. The one or more processors may thus, for example, use the first relative direction of the second device 116 and/or at least one of the second, third, or fourth relative directions of the second device 116 in any suitable manner, for example, to perform calculations to determine the estimated location of the second device 116. As just one example, the one or more processors may use multiple such relative directions, may discount the influence in calculations of any such relative direction that appears to be distorted (e.g., to have been determined from a distortion in an indication of a direction of orientation with respect to the indication of the direction of motion of the vehicle 102), etc., to determine the estimated location of the second device 116.

Where the one or more processors also or alternatively determine, for the first device 114 and/or at least one of the third device(s), a corresponding indication(s) of a strength of the signal 204, this corresponding indication(s) may be, for example, an indication(s) of a received strength(s) of the signal 204 at the first device 114 and/or the at least one of the third device(s), similar to the determination of a received signal strength as described with respect to block 312. The determination of the corresponding indication(s) of received strength(s) of the signal 204 may allow more accurate determination of the indication(s) of the location(s) of the additional device(s) in the vehicle 102, e.g., the one or more of the third, fourth, or fifth devices 122, 210, or 212. For example, as discussed above with respect to FIG. 3A, if the second device 116 is known to be connected to the OBD port of the vehicle 102, the indication of the second direction of orientation of the fourth device 210 (when the fourth device 210 is associated with the left rear passenger seat 206) may indicate that the second device 116 is straight ahead, e.g., in generally the same direction as the indicated direction of motion when the vehicle 102 is traveling straight ahead. As such, the indications of the received strengths of the signal 204 at the first device 114 and the fourth device 210, where the strength of the signal 204 as transmitted by the magnet 202 is known as described above, may be used to determine which of the first and fourth devices 114 and 210 is associated with the driver seat 112 and which of the first and fourth devices 114 and 210 is associated with the left rear passenger seat 206.

The one or more processors may determine at least one difference between corresponding ones of the at least one indication of the at least one first direction of orientation of the at least the third device and the at least one indication of the at least one second direction of orientation of the at least the third device (block 508). Thus, for each one of the at least the third device, a difference between the corresponding indication of the corresponding first direction of orientation of the third device and the corresponding indication of the corresponding second direction of orientation of the third device may be determined.

The one or more processors may determine, for each one of the at least the third device (e.g., for each one of the third device 122, the fourth device 210, and the fifth device 212), an indication of a location of the one of the at least the third device in the vehicle 102 based on the indication of the direction of motion of the vehicle 102 and based on at least one of the indication of the direction of orientation of the first device 114, at least one of the indication(s) of the first direction(s) of orientation of the at least the third device, or at least one of the indication(s) of the second direction(s) of orientation of the at least the third device (block 510). For example, in a similar manner to that described with respect to block 358, the one or more processors may determine the indication(s) of the location(s) of the third device(s) based at least in part on the difference(s) between respective indications of first and second direction(s) of orientation of the third device(s). Additionally, in one embodiment, the one or more processors may determine the aforementioned second, third, and/or fourth relative direction(s) of the second device 116 in a similar manner to that described above with respect to block 506, block 358, and FIG. 8.

With continued reference to the actions described with respect to block 510 and with further reference to FIG. 4, FIG. 4 shows an example of how the indication of the direction of orientation of the first device 114 and indications of the second directions of orientation of the third device 122, the fourth device 210, and the fifth device 212 may be used to determine an indication of a location of each one of the at least the third device. In particular, as noted above, representative dashed-line arrows 412, 414, and 416 point in the indicated second directions of orientation of the third device 122, the fourth device 210, and the fifth device 212. In the example of FIG. 4, the arrow 412 indicates a second direction of orientation of the third device 122 that differs from the indicated direction of motion of the vehicle 102 by more than the differences between the second directions of orientation of the fourth device 210 and the fifth device 212 (indicated by the arrows 414 and 416) and the indicated direction of motion of the vehicle 102.

Accordingly, it may be determined, when, for example, the third device 122, the fourth device 210, and the fifth device 212 may be assumed to be oriented in the direction of motion of the vehicle 102 and the second device 116 is attached to the rearview mirror, that the third device 122 corresponding to the arrow 412 is associated with the front passenger seat 120. It may also be determined that the fourth device 210 and the fifth device 212 are associated with the rear passenger seats 206 and 208. More particularly, for example, because the arrow 414 indicates a direction that differs from the indicated direction of motion of the vehicle 102 by a positive angle but by less than the difference described above with respect to the arrow 412, it may be determined in the present example that the fourth device 210 is associated with the left rear passenger seat 206. Furthermore, because the arrow 416 indicates a direction that differs from the indicated direction of motion of the vehicle 102 by a negative angle with an absolute value less than the absolute value of the difference described above with respect to the arrow 412, it may be determined in the present example that the fifth device 212 is associated with the right rear passenger seat 208.

With continued reference to the actions described with respect to block 510, in some embodiments, the one or more processors may use more than one of the indication of the direction of orientation of the first device 114, the at least one of the indication(s) of the first direction(s) of orientation of the at least the third device, or the at least one of the indication(s) of the second direction(s) of orientation of the at least the third device in any suitable manner to determine, for each one of the at least the third device, the indication of the location of the one of the at least the third device with greater accuracy than if a single such indication were used. The greater accuracy of the determined indication of the location of the one of the at least the third device may result from, for example, the ability of an additional indication(s) of a direction(s) to compensate for distortion of one or more of the indication(s) of the direction(s) in a generally similar manner as discussed above with respect to block 506.

With further reference to the actions described with respect to block 510, in some embodiments, the determination of the indication(s) of the location(s) of each one of the at least the third device in the vehicle 102 may be further based on the corresponding indication(s) of the strength of the signal 204 (as determined in performing the actions described with respect to block 506) and/or the location of the second device 116 (as determined as also described with respect to block 506). In this manner, for each one of the at least the third device, the accuracy of the determined indication of the location of the one of the at least the third device in the vehicle 102 may be still further enhanced in some situations.

In any event, with further reference to the actions described with respect to block 510, as with the indication of the location of the first device 114 in the vehicle 102 as described with respect to FIG. 3A, the indication(s) of the location(s) of each one of the at least the third device in the vehicle 102 may include an indication of whether the one of the at least the third device is associated with the driver seat 112 of the vehicle 102 or with one of the passenger seats 120, 206, or 208 of the vehicle 102. As such, the determination(s) of the indication(s) of the location(s) of the at least the third device may be used to facilitate the insuring of each of the second party/parties associated with the at least the third device.

Figures 6, 7:
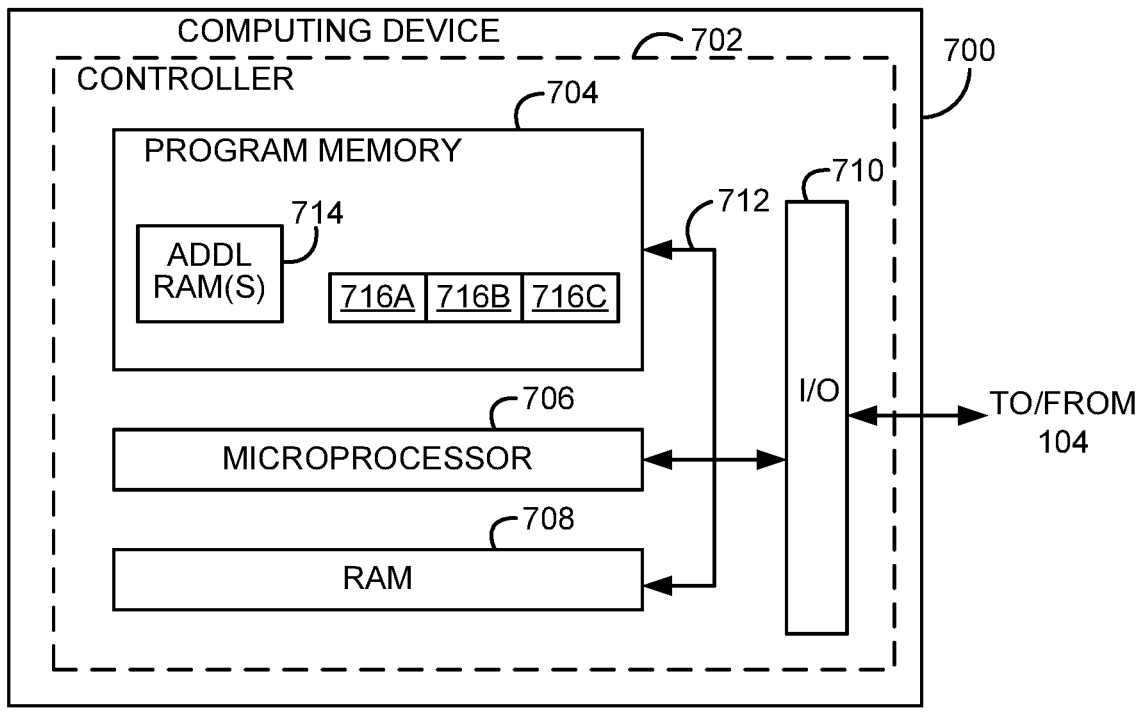
FIG. 6 is a table illustrating example relationships between an angle between an indication of a direction of motion of a vehicle and an indication of a direction of orientation of a device in the vehicle, a received signal strength at the device in the vehicle, and a determined indication of a location of the device in the vehicle.
FIG. 7 illustrates an example computing device and components thereof that may be used in implementing various devices of the example system of FIGS. 1, 2, and 4.

With still further reference to the actions described with respect to block 510, and turning also to FIG. 6, FIG. 6 is a table illustrating example relationships between: (i) an angle 602 between (a) the indication of the direction of motion of the vehicle 102 and (b) the indication of the direction of orientation of any one of the devices 114, 122, 210, or 212 (or any suitable device) as affected by the signal 204, when the actual direction of orientation of the one of the devices is the same as the indicated direction of motion of the vehicle 102 (thus making the angle 602 correspond to a relative direction of the second device 116, which may be (i) the direction to the second device 116 from the one of the devices 114, 122, 210, or 212 relative to (ii) the direction of motion of the vehicle 102); (ii) a received strength 604 of the signal 204 at the one of the devices; and (iii) a corresponding determination of an indication 606 of the location of the one of the devices in the vehicle 102. The example relationships shown in FIG. 6 may be based on a determination or assumption that the second device 116 is, for example, attached to the rearview mirror of the vehicle 102.

As shown in the example of FIG. 6, when the angle 602 is +45 degrees and the received strength 604 of the signal 204 is strong relative to the received strength 604 of the signal 204 at another device or devices, for example, the indication 606 may be that the device is located in or associated with a driver seat, such as the driver seat 112. When the angle 602 is −45 degrees and the received strength 604 of the signal 204 is strong, the indication 606 may be that the device is located in or associated with a front passenger seat, such as the front passenger seat 120. When the angle 602 is +30 degrees and the received strength 604 of the signal 204 is weak relative to the received strength 604 at another device or devices, for example, the indication 606 may be that the device is located in or associated with a left rear passenger seat, such as the left rear passenger seat 206. When the angle 602 is −30 degrees and the received strength 604 of the signal 204 is weak, the indication 606 may be that the device is located in or associated with a right rear passenger seat, such as the right rear passenger seat 208.

Continuing as to the example method, routine, or process 500, the indication of the location of the first device 114 in the vehicle 102 and/or at least one of the at least one indication of the location of the at least the third device in the vehicle 102 may be used to determine updated insurance data associated with the first party and/or at least one of the at least the second party (e.g., based on which party/parties is/are indicated to have been driving the vehicle 102 at which time/times) (block 512). Such updated insurance data may include any suitable information such as that discussed above with respect to block 316, and may be used to determine information regarding a cost of insuring the first party and/or the at least one of the at least the second party with respect to the vehicle 102 and/or with respect to another vehicle. Such information regarding a cost of insuring a party may be information similar to that described above with respect to block 316.

As noted above, by providing a system and method that allow determination of one or more indications of one or more locations of one or more devices in a vehicle, such as the vehicle 102, where the device(s) is/are associated with a party/parties in the vehicle 102, an insurance provider realizes a significant improvement in its ability to determine appropriate terms of coverage for any one or more of the party/parties with respect to the vehicle 102 or another vehicle. In particular, the system and method allow determination of when any one of the party/parties has been driving the vehicle 102 and allow updating of insurance data associated with such a party accordingly, thus facilitating determinations of pricing, terms of coverage, etc. with respect to the party, whether for insuring the party with respect to the vehicle 102 or another vehicle.

V. Example Operation of Remote Server

FIG. 7 illustrates an example computing device 700 and components thereof that may be used in implementing, for example, the remote server 106 and, in some embodiments, one or more of the first device 114, the third device 122, the fourth device 210, and the fifth device 212. The example computing device 700 may include a controller 702. The controller 702 may include a program memory 704, a microcontroller or a microprocessor 706, a random-access memory (RAM) 708, and an input/output (I/O) circuit 710, all of which may be interconnected via an address/data bus 712. The program memory 704 may store computer-executable instructions, which may be executed by the microprocessor 706.

It should be appreciated that although FIG. 7 depicts only one microprocessor 706, the controller 702 may include multiple microprocessors 706. Similarly, the program memory 704 of the controller 702 may include additional RAM(s) 714 and multiple program memories 716A, 716B and 716C (or any suitable number of multiple program memories) storing one or more corresponding modules, routines, and/or instructions, etc. according to the particular configuration of the controller 702 and the computing device 700. Such modules, routines, and/or instructions, etc. may be used in performing various operations for determining an indication of a location of a device in a vehicle, such as example operations as described above. Additionally, although FIG. 7 depicts the I/O circuit 710 as a single block, the I/O circuit 710 may include a number of different types of I/O circuits (not depicted). The RAM(s) 708, 714 and the program memory/memories 716A, 716B and 716C may be implemented in any known form of non-transitory computer readable storage media, including but not limited to semiconductor memories, magnetically readable memories, and/or optically readable memories. It should also be appreciated that the example computing device 700, and thus the remote server 106 and, in some embodiments, any one or more of the first device 114, the third device 122, the fourth device 210, and the fifth device 212, for example, may include additional, fewer, or alternate components.

VI. Example Direction of Motion, Directions of Orientation, and Relative Direction of Second Device FIG. 8 illustrates an example of the vehicle 102 where the first device 114 is not oriented in the indicated direction of motion of the vehicle 102, as discussed above with respect to, for example, FIG. 3B. As noted above, the first direction of orientation of the first device 114, relative to north and unaffected by the signal 204, may correspond to the angle 800, where an arrow in FIG. 8 is used to indicate the orientation of the first device 114. The second direction of orientation of the first device 114 (e.g., affected by the signal 204 as noted above) may correspond to the angle 802. The indication of the direction of motion of the vehicle 102, where the direction of motion of the vehicle 102 is shown by an arrow in FIG. 8, may also be relative to north, with north also being shown in FIG. 8 by an arrow. The direction of motion of the vehicle 102 may thus correspond to the angle 804.

As further noted above, the first relative direction of the second device 116 may be (i) the direction of the second device 116 from the first device 114 relative to (ii) the direction of motion of the vehicle 102, and may be determined by the following equation:

First relative direction=abs(direction of motion of vehicle 102)−abs(first direction of orientation of first device 114−second direction of orientation of first device 114)

Thus, the first relative direction of the second device 116 may be equal to the absolute value of the angle 804 minus the absolute value of the difference between the angles 800 and 802. As such, the first relative direction of the second device 116 may be determined to correspond to the angle 806 shown in FIG. 8, and thus the first relative direction of the second device 116 may be a northeast direction. In the present example, the first device 114 is located in the driver seat 112. However, it will be appreciated that the first device 114 may be located in the front passenger seat 120 or in either of the rear passenger seats 206 or 208. Furthermore, the first device 114 may be oriented in any other direction (not shown as such in FIG. 8), or may be located anywhere else in the vehicle 102 (not shown as such in FIG. 8). Still further, the aforementioned determinations may also be useful for determining an indication(s) of the location(s) of the third device 122, the fourth device 210, the fifth device 212, and/or any other device(s) located anywhere in the vehicle 102 and oriented in any direction.

VII. Additional Considerations

The following additional considerations apply to the foregoing discussion. Throughout this specification, plural instances may implement functions, components, operations, or structures described as a single instance. As noted above, although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the remote server 106, any of the devices in the vehicle 102, and/or any other computing devices within the example system 100 in any suitable combination). The routines may be included as part of any of the modules described in relation to FIGS. 1, 2, and 4 or as part of a module that is external to the system illustrated by FIGS. 1, 2, and 4. For example, the methods or portions thereof may be part of a browser application(s) or an application(s) running on the remote server 106 and/or any of the devices in the vehicle 102 as a plug-in or other module of the browser application. Further, the methods may be employed as "software-as-a-service" to provide, for example, the remote server 106 and/or any of the devices in the vehicle 102 with access to the example system 100.

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict preferred embodiments of an example system 100 and methods for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and method for determining an indication of a location of a device in a vehicle. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computer-implemented method for determining an indication of a location of a first device in a vehicle, the method comprising:
   determining, using one or more processors, when a second device in the vehicle does not transmit a signal, an indication of a first direction of orientation of the first device;
   determining, using the one or more processors, when the second device transmits the signal;
   determining, using the one or more processors, when the second device transmits the signal, an indication of a second direction of orientation of the first device, the indication of the second direction of orientation of the first device corresponding to the indication of the first direction of orientation of the first device changed in response to the signal being transmitted by the second device; and
   determining, using the one or more processors, the indication of the location of the first device in the vehicle based on an indication of a direction of motion of the vehicle and the indication of the second direction of orientation of the first device, the indication of the location of the first device including an indication of whether the first device is associated with a driver seat of the vehicle.

2. The computer-implemented method of claim 1, the first device being a device of a party in the vehicle, the second device including a magnetic device, wherein determining the indication of the location of the first device includes determining, using the one or more processors, a difference between (i) the indication of the first direction of orientation of the first device and (ii) the indication of the second direction of orientation of the first device.

3. The computer-implemented method of claim 1, the first device being associated with a party in the vehicle, the method further comprising sending, using the one or more processors, the indication of the location of the first device in the vehicle to an additional device to determine updated insurance data associated with the party when the indication of whether the first device is associated with the driver seat is an indication that the first device is associated with the driver seat.

4. The computer-implemented method of claim 3, the updated insurance data associated with the party including at least one of information regarding a cost of insuring the party with respect to the vehicle or information regarding a cost of insuring the party with respect to another vehicle.

5. The computer-implemented method of claim 1, the indication of the direction of motion of the vehicle being determined using the first device.

6. The computer-implemented method of claim 1, further comprising:
   determining, using the one or more processors, at least one of a location of the second device in the vehicle or an indication of a strength of the signal transmitted by the second device; and
   determining, using the one or more processors, the indication of the location of the first device further based on the at least one of the location of the second device in the vehicle or the indication of the strength of the signal transmitted by the second device.

7. The computer-implemented method of claim 1, the first device being associated with a first party in the vehicle, the method further comprising:
   receiving, using the one or more processors, at least one of (i) at least one indication, unaffected by the signal transmitted by the second device, of at least one first direction of orientation of at least a third device in the vehicle that is associated with at least a second party in the vehicle, or (ii) when the second device transmits the signal, at least one indication of at least one second direction of orientation of the at least the third device, each one of the at least one indication of the at least one second direction of orientation of the at least the third device being affected by the signal transmitted by the second device and corresponding to a respective one of the at least the third device; and
   determining, using the one or more processors, for each one of the at least the third device, an indication of a location of the one of the at least the third device in the vehicle based on the indication of the direction of motion of the vehicle and based on at least one of the indication of the second direction of orientation of the first device, at least one of the at least one indication of the at least one first direction of orientation of the at least the third device, or at least one of the at least one indication of the at least one second direction of orientation of the at least the third device, the indication of the location of the one of the at least the third device including an indication of whether the one of the at least the third device is associated with the driver seat of the vehicle or whether the one of the at least the third device is associated with a passenger seat of the vehicle, to facilitate insuring of each of the at least the second party.

8. A system for determining an indication of a location of a first device in a vehicle, the system comprising:
   the first device;
   a second device in the vehicle, the second device configured to transmit a signal;
   one or more processors; and
   one or more memories coupled to the one or more processors, the one or more memories including non-transitory computer executable instructions stored therein that, when executed by the one or more processors, cause the one or more processors to:

determine, when the second device does not transmit the signal, an indication of a first direction of orientation of the first device;

determine when the second device transmits the signal;

determine, when the second device transmits the signal, an indication of a second direction of orientation of the first device, the indication of the second direction of orientation of the first device corresponding to the indication of the first direction of orientation of the first device changed in response to the signal being transmitted by the second device; and determine the indication of the location of the first device in the vehicle based on an indication of a direction of motion of the vehicle and the indication of the second direction of orientation of the first device, the indication of the location of the first device including an indication of whether the first device is associated with a driver seat of the vehicle.

9. The system of claim 8, wherein the first device is a device of a party in the vehicle, wherein the second device includes a magnetic device, and wherein the non-transitory computer executable instructions, when executed by the one or more processors, cause the one or more processors to determine the indication of the location of the first device by determining a difference between (i) the indication of the first direction of orientation of the first device and (ii) the indication of the second direction of orientation of the first device.

10. The system of claim 8, wherein the first device is associated with a party in the vehicle, the one or more memories further including non-transitory computer executable instructions that when executed cause the one or more processors to send the indication of the location of the first device in the vehicle to an additional device to determine updated insurance data associated with the party when the indication of whether the first device is associated with the driver seat is an indication that the first device is associated with the driver seat.

11. The system of claim 10, the updated insurance data associated with the party including at least one of information regarding a cost of insuring the party with respect to the vehicle or information regarding a cost of insuring the party with respect to another vehicle.

12. The system of claim 8, the indication of the direction of motion of the vehicle being determined using the first device.

13. The system of claim 8, the one or more memories further including non-transitory computer executable instructions that when executed cause the one or more processors to:

determine at least one of a location of the second device in the vehicle or an indication of a strength of the signal transmitted by the second device; and determine the indication of the location of the first device further based on the at least one of the location of the second device in the vehicle or the indication of the strength of the signal transmitted by the second device.

14. The system of claim 8, wherein the first device is associated with a first party in the vehicle, the one or more memories further including non-transitory computer executable instructions that when executed cause the one or more processors to:

receive at least one of (i) at least one indication, unaffected by the signal transmitted by the second device, of at least one first direction of orientation of at least a third device in the vehicle that is associated with at least a second party in the vehicle, or (ii) when the second device transmits the signal, at least one indication of at least one second direction of orientation of the at least the third device, each one of the at least one indication of the at least one second direction of orientation of the at least the third device being affected by the signal transmitted by the second device and corresponding to a respective one of the at least the third device; and determine, for each one of the at least the third device, an indication of a location of the one of the at least the third device in the vehicle based on the indication of the direction of motion of the vehicle and based on at least one of the indication of the second direction of orientation of the first device, at least one of the at least one indication of the at least one first direction of orientation of the at least the third device, or at least one of the at least one indication of the at least one second direction of orientation of the at least the third device, the indication of the location of the one of the at least the third device including an indication of whether the one of the at least the third device is associated with the driver seat of the vehicle or whether the one of the at least the third device is associated with a passenger seat of the vehicle, to facilitate insuring of each of the at least the second party.

15. A computer readable storage medium comprising non-transitory computer readable instructions stored thereon for determining an indication of a location of a first device in a vehicle, wherein the instructions when executed on one or more processors cause the one or more processors to:

determine, when a second device in the vehicle does not transmit a signal, an indication of a first direction of orientation of the first device;

determine when the second device transmits the signal;

determine, when the second device transmits the signal, an indication of a second direction of orientation of the first device, the indication of the second direction of orientation of the first device corresponding to the indication of the first direction of orientation of the first device changed in response to the signal being transmitted by the second device; and determine the indication of the location of the first device in the vehicle based on an indication of a direction of motion of the vehicle and the indication of the second direction of orientation of the first device, the indication of the location of the first device including an indication of whether the first device is associated with a driver seat of the vehicle.

16. The computer readable storage medium of claim 15, wherein the first device is a device of a party in the vehicle, wherein the second device includes a magnetic device, and wherein the non-transitory computer readable instructions, when executed on the one or more processors, cause the one or more processors to determine the indication of the location of the first device by determining a difference between (i) the indication of the first direction of orientation of the first device and (ii) the indication of the second direction of orientation of the first device.

17. The computer readable storage medium of claim 15, wherein the first device is associated with a party in the vehicle, the computer readable storage medium further including non-transitory computer readable instructions stored thereon that when executed cause the one or more processors to send the indication of the location of the first device in the vehicle to an additional device to determine updated insurance data associated with the party when the indication of whether the first device is associated with the driver seat is an indication that the first device is associated with the driver seat.

18. The computer readable storage medium of claim 17, the updated insurance data associated with the party including at least one of information regarding a cost of insuring the party with respect to the vehicle or information regarding a cost of insuring the party with respect to another vehicle.

19. The computer readable storage medium of claim 15, further including non-transitory computer readable instructions stored thereon that when executed cause the one or more processors to:
   determine at least one of a location of the second device in the vehicle or an indication of a strength of the signal transmitted by the second device; and
   determine the indication of the location of the first device further based on the at least one of the location of the second device in the vehicle or the indication of the strength of the signal transmitted by the second device.

20. The computer readable storage medium of claim 15, wherein the first device is associated with a first party in the vehicle, the computer readable storage medium further including non-transitory computer readable instructions stored thereon that when executed cause the one or more processors to:
   receive at least one of (i) at least one indication, unaffected by the signal transmitted by the second device, of at least one first direction of orientation of at least a third device in the vehicle that is associated with at least a second party in the vehicle, or (ii) when the second device transmits the signal, at least one indication of at least one second direction of orientation of the at least the third device, each one of the at least one indication of the at least one second direction of orientation of the at least the third device being affected by the signal transmitted by the second device and corresponding to a respective one of the at least the third device; and
   determine, for each one of the at least the third device, an indication of a location of the one of the at least the third device in the vehicle based on the indication of the direction of motion of the vehicle and based on at least one of the indication of the second direction of orientation of the first device, at least one of the at least one indication of the at least one first direction of orientation of the at least the third device, or at least one of the at least one indication of the at least one second direction of orientation of the at least the third device, the indication of the location of the one of the at least the third device including an indication of whether the one of the at least the third device is associated with the driver seat of the vehicle or whether the one of the at least the third device is associated with a passenger seat of the vehicle, to facilitate insuring of each of the at least the second party.

\* \* \* \* \*